United States Patent [19]
Kleisath

[11] Patent Number: 5,548,921
[45] Date of Patent: Aug. 27, 1996

[54] METHOD AND APPARATUS FOR GASSING GOPHERS

[76] Inventor: William Kleisath, 1730 Magnolia, Walnut Creek, Calif. 94595

[21] Appl. No.: 412,323

[22] Filed: Mar. 31, 1995

[51] Int. Cl.$^6$ .......................... A01M 17/00; A01M 25/00
[52] U.S. Cl. ................................................. 43/124
[58] Field of Search ...................... 43/124, 125; 111/92, 111/99

[56] References Cited

U.S. PATENT DOCUMENTS

| | | | |
|---|---|---|---|
| 887,125 | 5/1908 | Reese | 43/124 |
| 1,401,293 | 12/1921 | Meter | 43/125 |
| 1,419,653 | 6/1922 | Van Meter | 43/124 |
| 1,727,457 | 9/1929 | Van Meter | 43/124 |
| 1,856,809 | 5/1932 | Gibson | 43/124 |
| 1,890,391 | 12/1932 | Lane | 43/124 |
| 2,539,271 | 1/1951 | Rianda | 43/124 |
| 2,783,581 | 3/1957 | Lee | 43/124 |
| 3,132,067 | 5/1964 | Rauscher | 43/124 |
| 3,550,542 | 12/1970 | Hollis | 43/124 |
| 4,413,440 | 11/1983 | Schultz | 43/124 |
| 5,394,643 | 3/1995 | Schmittmann | 43/124 |
| 5,399,288 | 3/1995 | Marzouk et al. | 252/186.21 |

*Primary Examiner*—J. Elpel
*Attorney, Agent, or Firm*—Townsend and Townsend and Crew LLP

[57] ABSTRACT

A system and method for gassing an animal, such as a gopher, within an underground burrow (52) comprises a probe (2) having a shaft (6) with first and second ends (8, 10) and a tip (14) on the first end. A shallow hole (54) is formed in the ground with the tip of the probe to locate the burrow and dry solid chlorine material is introduced into the burrow. Water is then poured into the hole onto the dry chlorine material to generate chlorine gas and the hole is closed to seal the gaseous poison within the burrow, thereby allowing the gaseous poison to expand throughout the burrow and gas the animal. Since chlorine gas is heavier than air, the gas will naturally follow the gopher to the deepest recesses of its underground dwelling, killing the gopher without endangering agriculture or other life above the ground.

12 Claims, 4 Drawing Sheets

5,548,921

METHOD AND APPARATUS FOR GASSING GOPHERS

FIELD OF THE INVENTION

This invention generally relates to underground animal extermination, and more specifically to a system and method for killing gophers or moles with a gaseous poison, such as chlorine.

BACKGROUND OF THE INVENTION

In various localities, gophers have become unwanted pests due to uncontrollable damage to orchards, gardens and other types of vegetation. Gophers or moles live in underground burrows which may include individual tunnels or runs of one-half mile or more in length. A community of gophers typically build a labyrinth of such underground runs and can become severe economic liabilities to farmers and other people engaged with agriculture. Accordingly, many measures have been taken by farmers and gardeners to eradicate these animals. Unfortunately, the extent of the underground labyrinth of tunnels and the multiple exits from these tunnels have made gophers extremely difficult to find and kill.

One known method of killing gophers or moles is to introduce a poisonous gas through one of the entrance or exit holes into the gopher burrow. The gas either kills the gopher or drives the gopher out through another hole where it can be killed by conventional means, e.g. a gun or club. It is important, however, to ensure that the poisonous gas does not escape back through the entrance hole, thereby causing damage to surrounding agriculture or possibly being inhaled by the user. To prevent this from occurring, the prior art has mainly focused on pressurized cartridges that form poisonous gases, such as chloro-cyanic gas, through chemical combustion and then distribute these pressurized gases into the gopher burrows. Typically, the containers have a tube that can be inserted deeply into the gopher burrow so that the chemical combustion necessary to liberate the gas takes place in the burrow after the gas has been discharged from the cartridge. This allows the operator to release the gas from a safe distance and ensures that all of the poisonous residue drops into the underground burrow.

Although the above described pressurized cartridges are somewhat effective, they are complicated to use and relatively costly to manufacture. In addition, there is a danger that the highly pressurized cartridge may explode if, for example, the operator produces too much pressure within the cartridge or improperly mixes the various chemicals. Accordingly, a need exists for a relatively inexpensive, safe and uncomplicated means for locating gopher burrows and exterminating the gophers residing within the burrows.

SUMMARY OF THE INVENTION

The present invention is directed to a system and method for gassing an animal, such as a gopher, within a burrow under the ground. According to the method, a probe is provided having a shaft with first and second ends and a tip on the first end. A shallow hole is formed in the ground with the tip of the probe to locate the gopher burrow. A dry solid chlorine material is introduced into the burrow and water is poured into the hole onto the dry chlorine material to generate chlorine gas. The hole is then closed to seal the gaseous poison within the burrow, thereby allowing the gaseous poison to expand throughout the burrow and gas the animal. Since the chlorine gas is heavier than air, the gas will automatically follow the gopher to the deepest recesses of its underground dwelling, killing the gopher without endangering agriculture or other life above the ground.

In a preferred configuration, the probe has an opening at the second end and an access port extending laterally from the shaft and in communication with the opening. The outer surface of the shaft has indicia formed near the first and second ends for determining the depth of the first and second ends when the probe has penetrated into the ground. With this configuration, the tip of the shaft is driven through the ground into the burrow and the depth of the first end is determined by reading the indicia. The shaft is then flipped around and the second end is positioned into the hole at the same depth (by comparing the indicia) so that this open end is in communication with the burrow. Dry solid chlorine material, such as chlorine granules or pellets, is then introduced through the access port into an inner lumen within the shaft and directed through the open end into the gopher burrow.

One of the advantages of the invention is that it provides an effective, yet inexpensive and relatively easy method for exterminating gophers or moles. The gaseous poison is formed simply by pouring water onto the dry solid chlorine material and allowing it to expand throughout the burrow. Since the chlorine gas is heavier than air, there is no need to pressurize it to ensure that the gas follows the gopher to the bottom of the burrow. Another advantage is that the invention is relatively safe because both the user and the probe only contact the dry solid chlorine material; not the gaseous poison. This is because the probe can be removed from the hole before the water is poured onto the dry chlorine. In addition, the poisonous gas takes time to generate and expand (at least a few seconds) so the hole can be easily covered up with dirt before the gas is allowed to escape.

Other features and advantages of the invention will appear from the following description in which the preferred embodiment has been set forth in detail in conjunction with the accompanying drawings.

DESCRIPTION OF THE PREFERRED EMBODIMENTS

Figure 1:
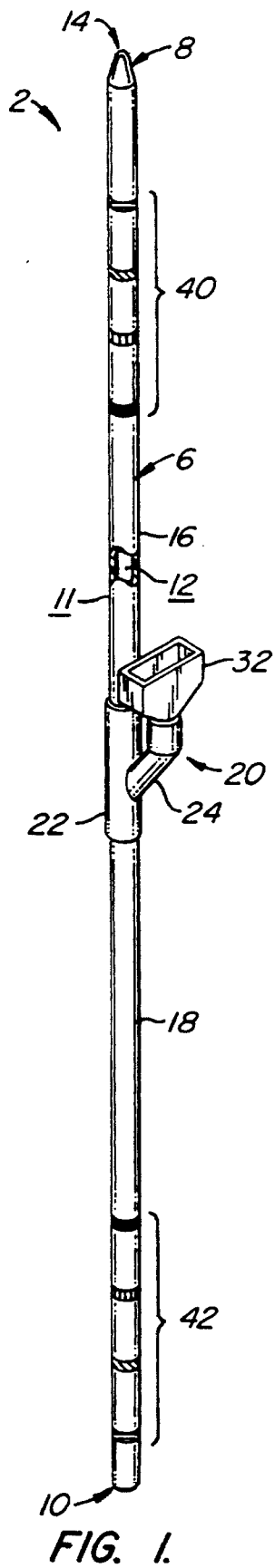
FIG. 1 is a perspective view of a probe for locating an animal burrow and dispensing poisonous material therein.

Referring to the drawings in detail, wherein like numerals indicate like elements, a probe 2 for dispensing solid poison material, such as dry chlorine pellets, into an underground animal burrow is illustrated according to the principles of the invention. Probe 2 generally comprises a shaft 6 having a first, closed end 8 for piercing the ground and locating the burrow and a second open end 10 for discharging the dry chlorine pellets into the burrow.

Figure 2:
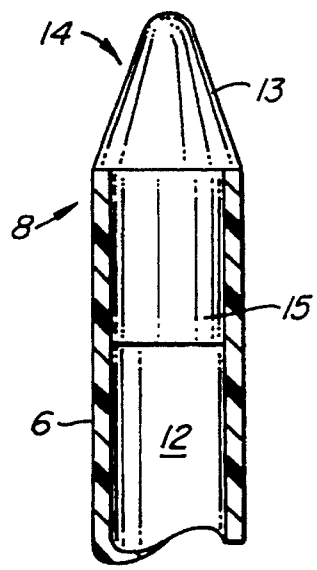
FIG. 2 is an enlarged cross-sectional view of a tip of the probe of FIG. 1.

Referring to FIG. 1, shaft 6 is preferably a hollow plastic tube having an outer surface 11 and an inner lumen 12 extending between first and second ends 8, 10. Since the gopher burrow generally extends about 6 inches to one foot underground, shaft 6 will preferably have a length of about 2–4 feet. As shown in FIG. 2, probe 2 further includes a tip 14 having a tapered portion 13 for piercing through the ground and a cylindrical portion 15 sized to be press-fit within first end 8 of shaft 6. Cylindrical portion 15 seals first end 8 so that dirt does not enter inner lumen 12 while probe 2 is piercing the ground (discussed in more detail below). Tip 14 is preferably made of plastic, but tip 14 may be a harder material, such as stainless steel, to facilitate the penetration of hard or rocky terrain.

Figure 3B:
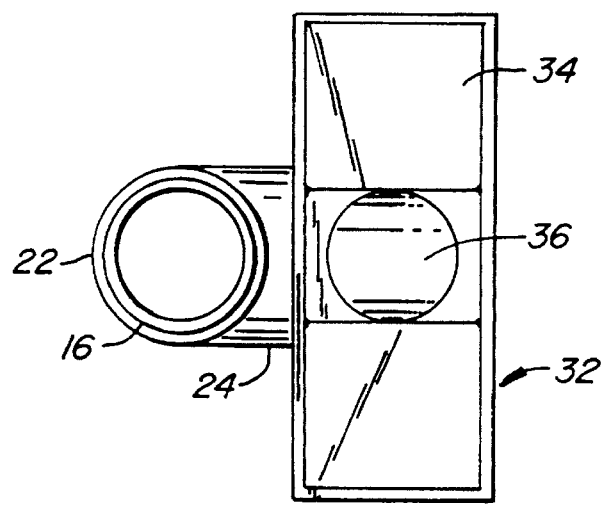
FIGS. 3A and 3B are enlarged side and front cross-sectional views, respectively, of an access port for introducing a solid poison material into the probe of FIG. 1.
Figure 3A:
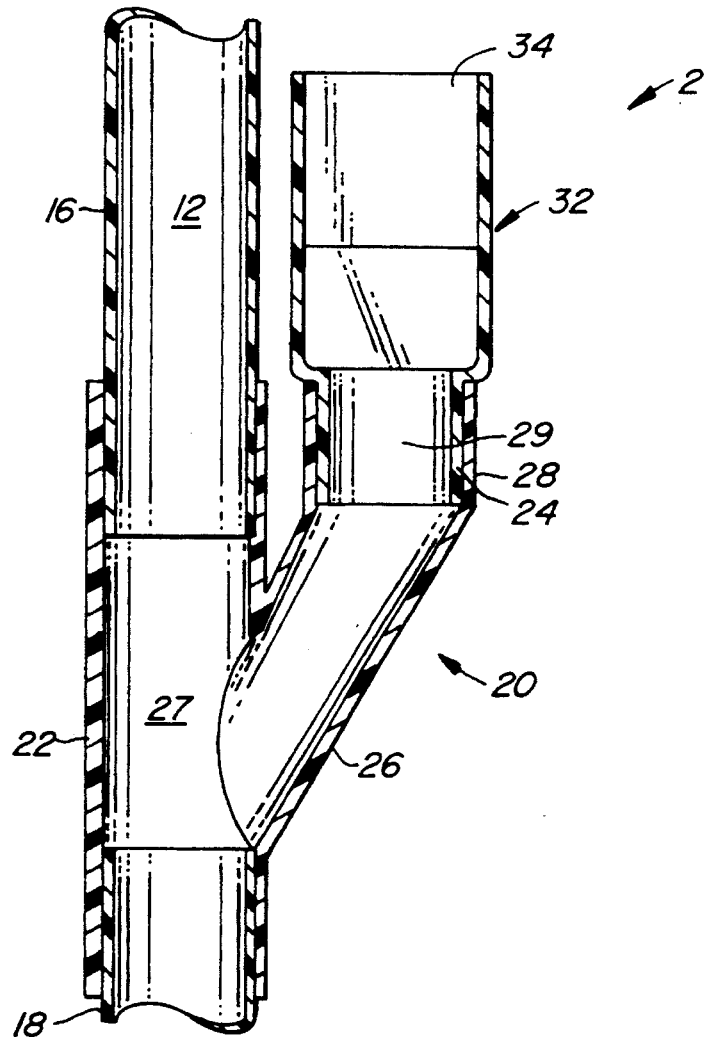

In a preferred configuration, shaft 6 of probe 2 is formed with first and second hollow tubes 16, 18 that are connected together by a Y-shaped fitting 20. As best shown in FIGS. 3A and 3B, fitting 20 is preferably made of plastic and comprises a hollow coupling member 22 and an access port 24 extending laterally from coupling member 22. Access port 24 comprises a first inclined portion 26 extending from and in communication with an inner lumen 27 within coupling member 22. Access port 24 further includes a second portion 28 extending from inclined portion 26 and having an opening 29 for receiving the dry solid chlorine material. Inclined portion 26 preferably extends towards tip 14 at an angle of about 20–70 degrees from shaft 6 to facilitate the introduction of the chlorine material when second end 10 is in the ground (see FIG. 4B).

Hollow tubes 16, 18 have a diameter slightly smaller than a diameter of the coupling member 22 so that they can be inserted into coupling member 22 forming a press-fit therein. Of course, it will be readily recognized by those skilled in the art that the invention is not limited to the above described configuration. For example, probe 2 may comprise a single shaft having an opening between the first and second ends 8, 10 for directly supplying chlorine into shaft 6. Alternatively, tip 14 can be removable so that the chlorine is supplied from first end 8.

As shown in FIGS. 3A and 3B, probe 2 preferably comprises a funnel 32 having an enlarged opening 34 on one end and a relatively narrow opening 36 on the other end. Narrow opening 36 is attached to second portion 28 of access port 24 to form a passage therethrough. Funnel 32 serves to facilitate the introduction of chlorine material into shaft 6 and enables chlorine in other forms, such as powder or granules, to be easily delivered into enlarged opening 34.

Referring again to FIG. 1, shaft 6 has indicia formed on outside surface 11 for determining the depth of first and second ends 8, 10 when probe 2 is disposed within a gopher burrow. In the preferred configuration, the indicia comprise first and second groups of colored bands 40, 42 formed near first and second ends 8, 10, respectively. Each band within the first group 40 has a different color and is positioned a predetermined distance away from first end 8. Similarly, each band within the second group 42 has a different color and is positioned a predetermined distance away from second end 10. The color of the bands in first and second groups 40, 42 correspond with each other so that second end 8 can be positioned at the same depth as first end 10 by comparing the respective colored bands when the first and second ends are in the gopher burrow. Preferably, the first group of colored bands 40 are slightly further away from first end 8 than the second group of colored bands 42 are from second end 10 to allow for room within the burrow for flow of the chlorine material, as discussed in more detail below.

Figure 4A:
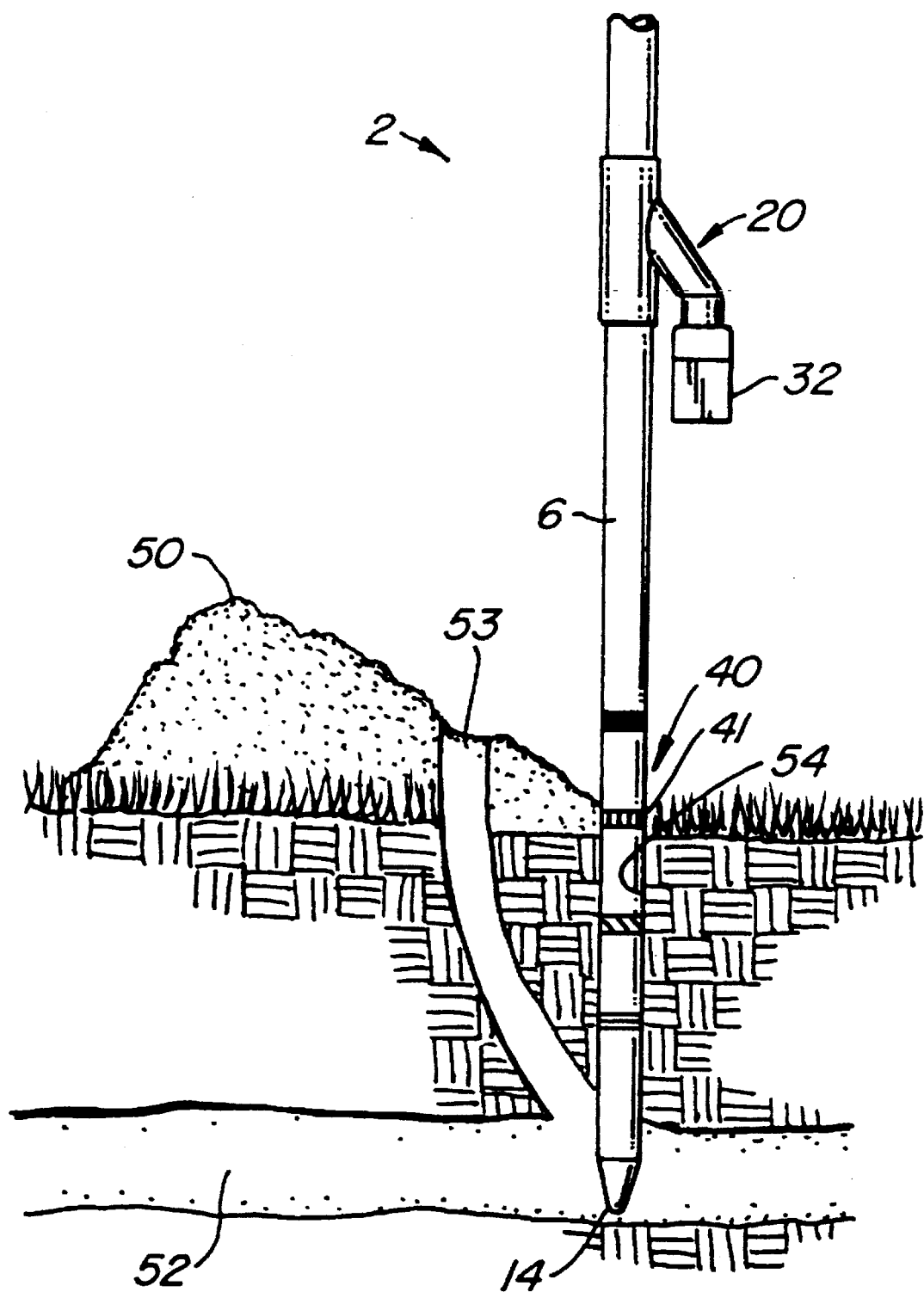
FIGS. 4A–4C illustrate a method of gassing gophers with the probe of FIG. 1 according to the principles of the present invention.
Figure 4B:
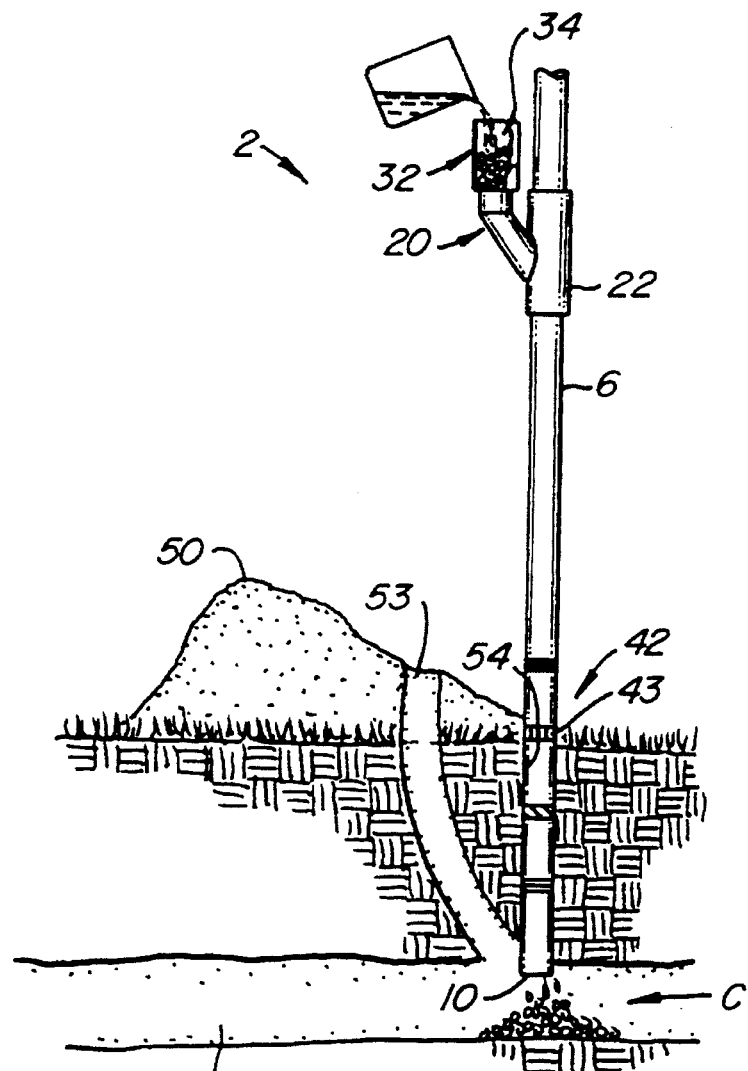
Figure 4C:
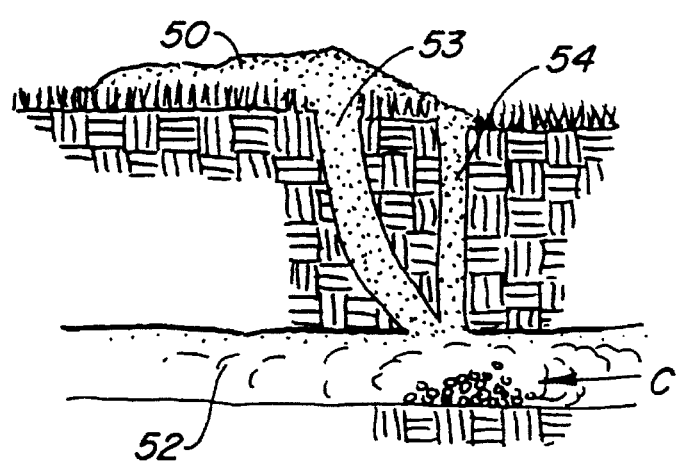

FIGS. 4A–4C illustrate a method of locating a gopher burrow and dispensing chlorine therein to gas the gopher according to the principles of the present invention. As shown in FIG. 4A, the user first locates a mound of soft dirt 50 that typically indicates the presence of an underground gopher burrow 52. A hole 54 is formed by piercing tip 14 of probe 2 through mound 50 and pushing downward through the soft dirt until tip 14 has slipped into burrow 52. Since the dirt above burrow 52 is generally soft, the user can tactilely determine when tip 14 is within the burrow when he/she encounters resistance as tip 14 contacts the hard dirt on the bottom of the burrow. The user then ascertains the relative depth of tip 14 by noting which of the first group of colored bands 41 is slightly above ground level. Tip 14 may be moved around slightly to firm up the opening of hole 54.

Referring to FIG. 4B, tip 14 of shaft 6 is then removed from hole 54, probe 2 is inverted and second open end 10 of shaft 6 is introduced through hole 54 into burrow 52. The user determines that second open end 10 is within the burrow when the colored band 43 that corresponds to the above indicated band 41 is slightly above ground level. Second group of colored bands 42 are slightly closer to second end 10 to space the opening of second end 10 away from the bottom of burrow 52. Second end 10 will preferably be about 2 inches above the bottom of burrow 52 to facilitate the free flow of the chlorine material through second open end 10.

Once second end 10 of shaft 6 is within burrow 52, a chlorine C (see FIGS. 4B and 4C) producing chemical in the form of solid pellets or granules is supplied into enlarged opening 34 of funnel 32 (or directly into access portion 24 of fitting 20). The preferred chlorine producing chemical is sodium dichloro-s-triazinetrione. The chlorine is directed through lumen 12 of shaft 6 and into hole 54 through open end 10. The user may shake probe 2 to ensure that all of the chemicals have been discharged into the burrow. Probe 2 is removed and a cup of water (not shown) is poured through hole 54 onto the solid dry chlorine to generate a poison gas. It should be understood that neither the user nor probe 2 directly contacts the poison gas.

As shown in FIG. 4C, the user then seals hole 54 by covering it with dirt to ensure that the poison gas does not exit back through the hole. Any noticeable gopher holes 53 should be covered with dirt as well to prevent the gas from escaping through these holes. Using this method, the operator may quickly introduce chlorine into a variety of spaced positions along the underground tunnel(s) to ensure that the gas fills the entire burrow.

The above is a detailed description of various embodiments of the invention. It is recognized that departures from the disclosed embodiments may be made within the scope of the invention and obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A method for gassing an animal within a burrow under the ground comprising the steps of:

providing a probe having a tip on a first end for poking a shallow hole in the ground;

providing a dry solid chlorine material capable of generating chlorine gas when wetted;

forming a hole in the ground in communication with the burrow with the tip of the probe:

introducing the dry solid chlorine material into the burrow through the formed hole;

pouring water into the formed hole onto the dry solid chlorine material to form chlorine gas; and, closing the hole to seal the chlorine gas within the burrow, thereby allowing the chlorine gas to expand throughout the burrow and gas the animal.

2. The method of claim 1 wherein the forming step comprises piercing the ground with the tip and tactilely determining when the tip is positioned within the burrow.

3. The method of claim 2 further including the steps of:

determining a reference depth below the ground surface of the first end of the probe when the tip is positioned within the burrow;

removing the first end of the probe from the ground; and introducing a second end of the probe into the hole until the second end is at a depth substantially equivalent to the reference depth.

4. The method of claim 3 further including the step of removing the second end of the probe from the hole after the dry solid chlorine material has been directed into the burrow.

5. The method of claim 3 wherein the determining step is carried out by viewing indicia on an exterior portion of the probe near the first end and determining the reference depth of the first end based on the indicia.

6. The method of claim 5 further comprising the step of comparing indicia on an exterior portion of the probe near the second end with the indicia on the first end to determine whether the opening at the second end is within the burrow.

7. The method of claim 1 wherein the introducing step comprises:

providing an access port in the probe having an exit opening at a second end of the probe, an entrance, and an inner lumen there between;

inserting the dry solid chlorine material through the access port laterally extending from the probe between the first and second ends;

directing the chlorine material through the inner lumen in the probe in communication with the exit opening at the second end; and discharging the chlorine material through the exit opening into the burrow.

8. The method of claim 7 wherein the inserting step comprises supplying a plurality of chlorine granules into an enlarged opening of a funnel coupled to the access port.

9. The method of claim 7 wherein the inserting step comprises supplying a plurality of chorine pellets directly into the access port.

10. A probe for dispensing solid poison material into an animal burrow under the ground comprising:

a shaft having an outer surface, a first end with a tip for forming a shallow hole in the ground to tactilely determine a location of the animal burrow and a second end with an opening for dispensing the solid poison material into the animal burrow, the shaft defining an inner lumen in communication with the opening;

an access port laterally extending from the shaft between the first and second ends for introducing the solid poison material into the inner lumen;

indicia on the outer surface of the shaft near the first and second ends for determining a first depth of the first end of the shaft when the first end is under the ground and a second depth of the opening when the second end of the shaft in under the ground; and, wherein the indicia comprises first and second groups of colored bands formed around the outside surface of the shaft near the first and second ends, respectively, each of the first group of colored bands being spaced from the first end by a predetermined distance and having a different color and each of the second group of colored bands being spaced from the second end by a predetermined distance and having a different color.

11. The probe of claim 10 wherein each of the first group of colored bands corresponds to one of the second group of colored bands for determining whether the second depth is substantially equivalent to the first depth.

12. The probe of claim 11 wherein each of the first group of colored bands is further away from the first end of the shaft than the corresponding colored band in the second group is from the second end of the shaft.

* * * * *